United States Patent
Yoon et al.

(10) Patent No.: US 9,633,273 B2
(45) Date of Patent: Apr. 25, 2017

(54) METHOD FOR PROCESSING IMAGE AND ELECTRONIC DEVICE THEREOF

(71) Applicant: Samsung Electronics Co., Ltd., Suwon-si, Gyeonggi-do (KR)

(72) Inventors: Young-Kwon Yoon, Seoul (KR); Hwa-Yong Kang, Suwon-si (KR); Moon-Soo Kim, Seoul (KR); Tae-Ho Kim, Cheongju-si (KR); Jin-Hong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/547,827

(22) Filed: Nov. 19, 2014

(65) Prior Publication Data

US 2015/0139496 A1    May 21, 2015

(30) Foreign Application Priority Data

Nov. 20, 2013   (KR) .................. 10-2013-0141419

(51) Int. Cl.
G06K 9/20     (2006.01)
G06K 9/32     (2006.01)
G06K 9/00     (2006.01)

(52) U.S. Cl.
CPC ....... *G06K 9/2081* (2013.01); *G06K 9/00604* (2013.01); *G06K 9/3233* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,343,098 B1* | 1/2002 | Boyce | .................. | H04N 19/176 375/240.03 |
| 8,311,364 B2* | 11/2012 | Cerosaletti | ............. | G06K 9/036 382/112 |
| 8,634,601 B2* | 1/2014 | Bedros | ............... | G06K 9/00221 382/115 |
| 8,836,728 B2* | 9/2014 | Tan | .................. | H04N 21/45455 345/660 |
| 2001/0019621 A1* | 9/2001 | Hanna | ....................... | G06T 5/50 382/107 |
| 2002/0105531 A1* | 8/2002 | Niemi | ...................... | G06F 3/14 345/660 |
| 2004/0013319 A1* | 1/2004 | Wenstrand | ........... | H04N 3/1587 382/299 |
| 2007/0274608 A1* | 11/2007 | Le Leannec | ............... | G06T 3/40 382/299 |
| 2009/0080695 A1 | 3/2009 | Yang | | |
| 2009/0213218 A1* | 8/2009 | Cilia | .................... | H04N 19/136 348/143 |
| 2011/0169921 A1* | 7/2011 | Lee | ..................... | H04N 5/23212 348/46 |

(Continued)

FOREIGN PATENT DOCUMENTS

KR     10-0883632 B1     2/2009

*Primary Examiner* — Anand Bhatnagar
(74) *Attorney, Agent, or Firm* — Jefferson IP Law, LLP

(57) ABSTRACT

A method of operating an electronic device is provided. The method of operating an electronic device includes displaying an image of a first resolution, determining at least a partial region of the image, and displaying an image of a second resolution corresponding to the partial region.

17 Claims, 20 Drawing Sheets

(56) References Cited

U.S. PATENT DOCUMENTS

| | | | |
|---|---|---|---|
| 2012/0218468 A1* | 8/2012 | Tan | H04N 21/45455 348/441 |
| 2012/0288165 A1 | 11/2012 | Bedros et al. | |
| 2013/0011028 A1* | 1/2013 | Marugame | G06T 3/40 382/128 |
| 2013/0215116 A1* | 8/2013 | Siddique | G06Q 30/0643 345/420 |

* cited by examiner

METHOD FOR PROCESSING IMAGE AND ELECTRONIC DEVICE THEREOF

CROSS-REFERENCE TO RELATED APPLICATION(S)

This application claims the benefit under 35 U.S.C. §119(a) of a Korean patent application filed on Nov. 20, 2013 in the Korean Intellectual Property Office and assigned Serial No. 10-2013-0141419, the entire disclosure of which is hereby incorporated by reference.

TECHNICAL FIELD

The present disclosure relates to a method for processing an image and an electronic device thereof.

BACKGROUND

Nowadays, as multimedia technology develops, electronic devices having various functions are available. Such electronic devices generally have a convergence function that complexly performs at least one function.

Moreover, as the electronic device, a mobile terminal that may be classified into a so-called 'smart phone' is generally used. Particularly, such a mobile terminal has a display module of a large screen touch method and has a highpixel camera module in addition to a basic function of communication with another party and thus may photograph a still picture and a moving picture. Further, as a desired region or a Region Of Interest (ROI) can be freely edited in a presently photographing image, the mobile terminal has been remarkably developed such that a main function of communicating with another party is regarded as an additional function.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of processing an image and an electronic device thereof that can operate an Region Of Interest (ROI) of an image in the electronic device.

Another aspect of the present disclosure is to provide a method of processing an image and an electronic device thereof that can reduce power consumption necessary for authentication in the electronic device and that can increase an authentication speed.

Another aspect of the present disclosure is to provide a user interface that can intuitively operate a high resolution image in an electronic device.

In accordance with an aspect of the present disclosure, a method of operating an electronic device is provided. The method includes displaying an image of a first resolution, determining at least a partial region of the image, and displaying an image of a second resolution corresponding to the partial region.

In one embodiment, the second resolution is higher than the first resolution.

In one embodiment, the first resolution image is acquired through a first image sensor, and the second resolution image is acquired through a second image sensor.

In one embodiment, the first resolution and the second resolution are determined by the same image sensor.

In one embodiment, the determining of at least a partial region includes determining the partial region based on at least one user input.

In one embodiment, the determining of at least a partial region includes determining the partial region based on attribute information of the first resolution image.

In one embodiment, the attribute information includes at least one of a pattern, a size, and a resolution of the first resolution image.

In one embodiment, the partial region includes an image area corresponding to at least one of an iris, a face, a text, and a barcode.

In one embodiment, the first resolution and the second resolution have the same pixel number.

In one embodiment, a down sampling method is applied to the first resolution image.

In one embodiment, the method further includes determining whether the second resolution is equal to or greater than a reference resolution for authentication.

In one embodiment, the method further includes increasing the second resolution by a predetermined value, if the second resolution is less than a reference resolution for authentication.

In accordance with another aspect of the present disclosure, an electronic device is provided. The electronic device includes a display device, at least one image sensor, and at least one processor, wherein the processor is configured to control to display an image of a first resolution, to determine at least a partial region of the image, and to display an image of a second resolution corresponding to the determined partial region.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF THE DRAWINGS

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When describing embodiments of the present disclosure, an electronic device to which a display device as a display unit is applied and including at least one camera module is described, but the electronic device is not limited thereto. For example, the electronic device may be various devices including at least one camera module, i.e., various devices such as a Personal Digital Assistant (PDA), a laptop computer, a mobile phone, a smart phone, a Netbook computer, a television, a Mobile Internet Device (MID), a Ultra Mobile Personal Computer (UMPC), a tablet Personal Computer (PC), a wrist watch, a camera device, a navigation device, a MPEG Layer 3 (MP3) player, and a wearable device.

Figure 1:
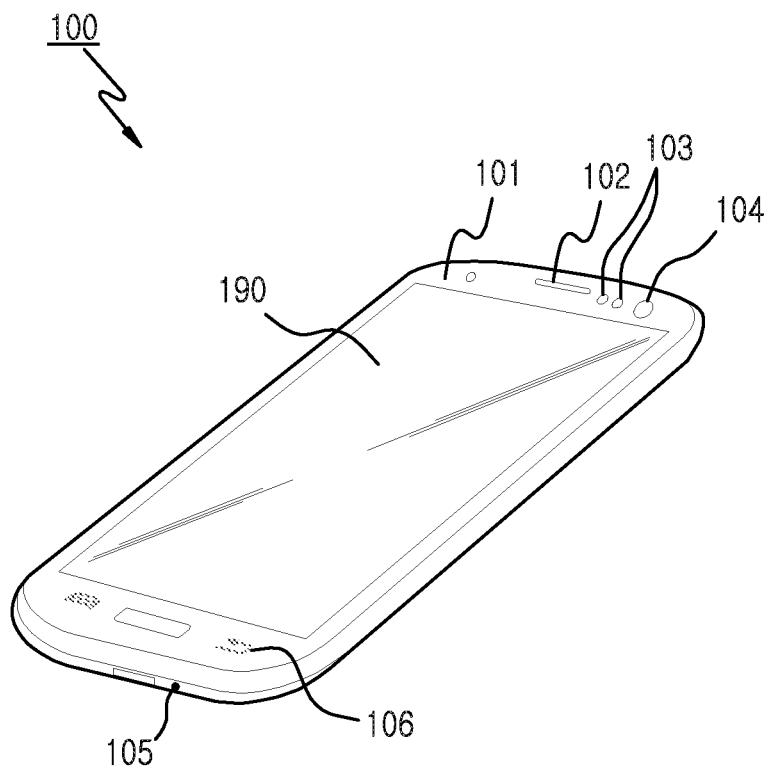
FIG. 1 is a perspective view illustrating an electronic device according to an embodiment of the present disclosure.

FIG. 1 is a perspective view illustrating an electronic device according to an embodiment of the present disclosure.

Referring to FIG. 1, in the electronic device 100, a display device 190 may be installed at a front surface 101 thereof. The display device 190 may convert and display an electrical signal into a text and an image such as a graphic and a video. Further, the display device 190 may be implemented with a touch screen that can simultaneously input/output data using touch sensor technology.

In an upper portion of the display device 190, an ear piece 102 that receives a sound may be installed, and at a periphery of the ear piece 102, a plurality of sensors 103, for use convenience of the electronic device 100, such as a proximity sensor or an illumination sensor may be installed.

According to an embodiment, the electronic device 100 may include at least one camera module 104 that photographs a subject. Such a camera module 104 is disposed at the front surface 101 of the electronic device 100 to perform a self-camera function or to be used for audiovisual communication. Further, the camera module 104 installed at the front surface 101 may be used for recognizing a portion of a human body such as a face or an iris for user authentication.

According to an embodiment, the camera module 104 may photograph a still image or a moving picture and output image information received through the image sensor through the display device 190. Such an image sensor may perform a down sampling operation using at least one of a sub sampling method, a binning method, and a resizing method. However, the present disclosure is not limited thereto, and the image sensor may perform a down sampling operation through various methods.

The electronic device 100 may further include a microphone device 105 located in a lower portion of the display device 190 and that receives an input of a sound and a keypad device 106 in which key buttons are disposed. However, elements of the electronic device 100 are not limited thereto, and in the electronic device 100, various additional devices that perform known other additional functions may be further installed.

Figure 2A:
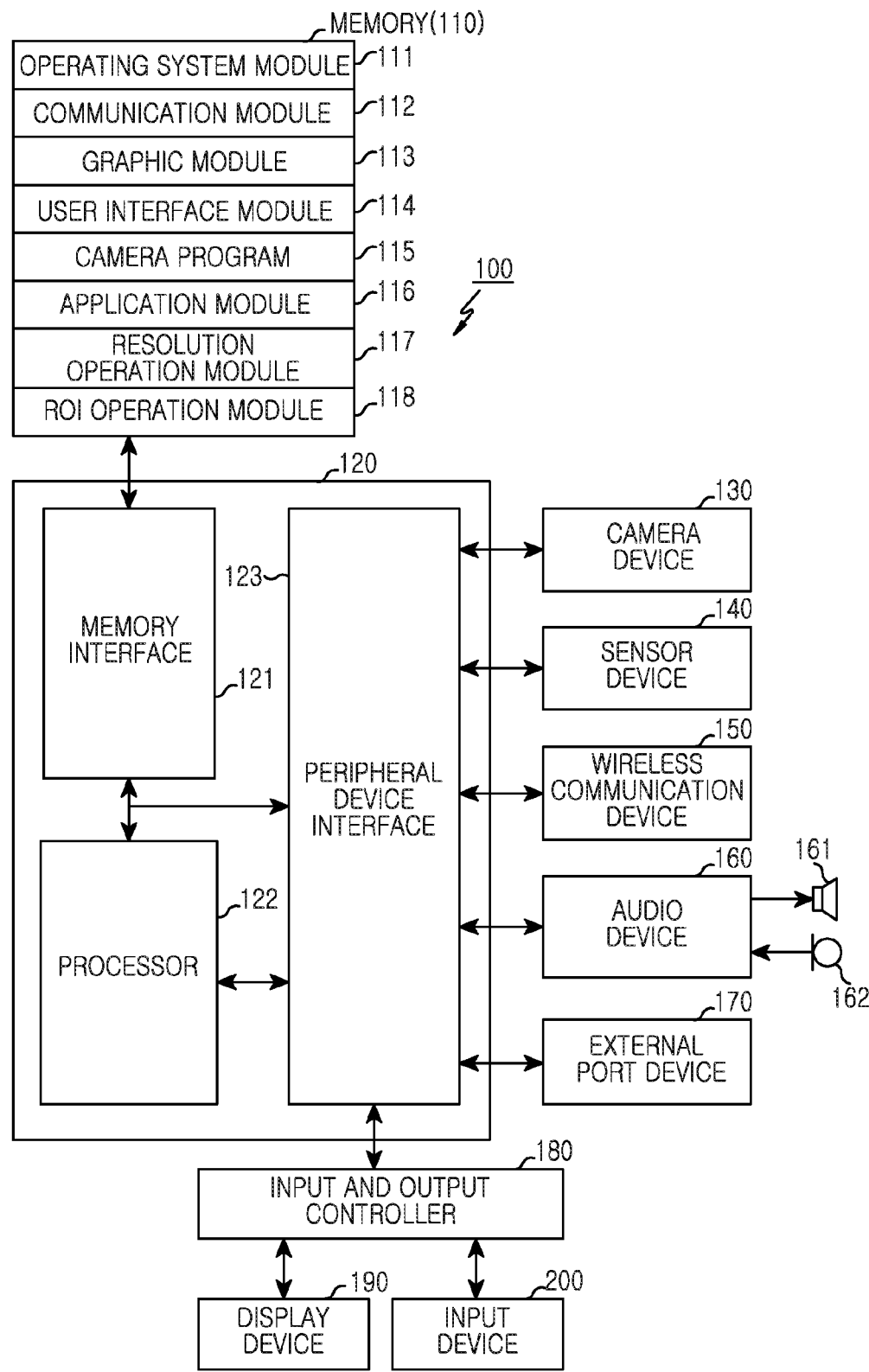
FIG. 2A is a block diagram illustrating a configuration of an electronic device according to an embodiment of the present disclosure.

FIG. 2A is a block diagram illustrating a configuration of an electronic device according to an embodiment of the present disclosure.

Referring to FIG. 2A, the electronic device 100 may be a device such as a PDA, a laptop computer, a mobile phone, a smart phone, a Netbook computer, a hand-held computer, an MID, a media player, a UMPC, a tablet PC, a notebook PC, a wrist watch, a navigation device, an MP3 player, a camera device, and a wearable device. Further, the electronic device 100 may be a random device including a device in which two or more functions of such devices are coupled.

According to an embodiment, the electronic device 100 may include a memory 110, a processor unit 120, a camera device 130, a sensor device 140, a wireless communication device 150, an audio device 160, an external port device 170, an input and output controller 180, a display device 190, and an input device 200. The memory 110 and the external port device 170 may be formed in plural.

Each constituent element will be described as follows.

The processor unit 120 may include a memory interface 121, at least one processor 122, and a peripheral device interface 123. Here, the memory interface 121, the at least one processor 122, and the peripheral device interface 123 included in the processor unit 120 may be integrated into at least one integrated circuit or may be implemented with a separate constituent element.

The memory interface 121 may control access of a constituent element such as the processor 122 or the peripheral device interface 123 to the memory 110.

The peripheral device interface 123 may control a connection of the memory interface 121, the processor 122, and an input and output peripheral device of the electronic device 100.

The processor 122 may control the electronic device 100 to provide various multimedia services using at least one software program. By executing at least one program stored at the memory 110, the processor 122 may provide a service corresponding to the program.

By executing several software programs, the processor 122 may perform several functions for the electronic device 100 and perform a processing and control for audio dedicated communication, audiovisual communication, and data communication. Further, by interlocking with software modules stored at the memory 110, the processor 122 may perform a method according to various embodiments of the present disclosure.

The processor 122 may include at least one data processor, image processor, or coder and decoder (codec). Further, the electronic device 100 may separately form a data processor, an image processor, or a codec.

Various constituent elements of the electronic device 100 may be connected through at least one communication bus (not shown) or an electrical connection means (not shown).

The camera device 130 may perform a camera function of a picture, video clip, and recording. The camera device 130 may include a Charged Coupled Device (CCD) or a Complementary Metal-Oxide Semiconductor (CMOS). Further, the camera device 130 may change a hardware configuration, for example, may adjust a lens movement and the number of apertures according to a camera program in which the processor 122 executes. Such camera device 130 may be implemented with a closed loop method that applies a feedback principle.

According to an embodiment, the camera device 130 may provide collected images acquired by photographing a subject to the processor unit 120. The camera device 130 may include an image sensor that converts an optical signal to an electrical signal, an image signal processor that converts an analog image signal to a digital image signal, and a digital signal processor that performs an image processing so as to display an image signal output from the image signal processor in the display device 190. Although not shown, the camera device 130 may include an actuator that moves a lens and a driver Integrated Circuit (IC) that drives the actuator. The camera device 130 may move a lens thereof using at least one of a Voice Coil Motor (VCM) method, a piezo method, and a liquid lens method, or may adjust a focal distance through a matter property change by an electrical characteristic. Further, the image sensor may perform a down sampling operation using at least one of a sub sampling method, a binning method, and a resizing method. The image sensor may acquire an image of a low resolution through such a down sampling operation. Further, the image sensor may perform user authentication through an image of a portion of a human body such as an iris.

The sensor device 140 may include a proximity sensor, a hall sensor, an illumination sensor, a motion sensor, etc. For example, the proximity sensor may detect an object approaching the electronic device 100, and the hall sensor may detect a magnetic force of a metal body. Further, the illumination sensor may detect light of a periphery of the electronic device 100, and the motion sensor may include an acceleration sensor or a gyro sensor that detects a motion of the electronic device 100. However, the sensor device 140 is not limited thereto and may further include various sensors that perform known other additional functions.

The wireless communication device 150 enables to perform wireless communication and may include a radio frequency transmitter and receiver or a light (e.g., infrared rays) transmitter and receiver. Although not shown, the wireless communication device 150 may include a Radio Frequency Integrated Circuit unit (RF IC unit) and a base band processor. The RF IC unit may transmit and receive electromagnetic waves, convert a base band signal from the base band processor to electromagnetic waves, and transmit the electromagnetic waves through an antenna.

The RF IC unit may include an RF transceiver, an amplifier, a tuner, an oscillator, a digital signal processor, a codec chip set, and a Subscriber Identity Module (SIM) card.

The wireless communication device 150 may operate through at least one of a Global System for Mobile Communication (GSM) network, an Enhanced Data GSM Environment (EDGE) network, a Code Division Multiple Access (CDMA) network, a Wideband Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network, an Near Field Communication (NFC) network, an Infrared ray communication network, and a Bluetooth network according to a communication network. However, the wireless communication device 150 is not limited thereto and may use several communication methods through a protocol for an e-mail, instant messaging, or a Short Message Service (SMS).

The audio device 160 may be connected to a speaker 161 and a microphone 162 to perform an audio input and output function such as a speech recognition, voice duplication, digital recording, or communication function. The audio device 160 may provide an audio interface between a user and the electronic device 100, convert a data signal received from the processor 122 to an electric signal, and output the converted electric signal through the speaker 161.

The speaker 161 may convert and output an electric signal to an audible frequency band and be disposed at the front side or the rear side of the electronic device 100. The speaker 161 may include a flexible film speaker in which at least one piezoelectric body is attached to a vibration film.

The microphone 162 may convert a sound wave transferred from a person or other sound sources to an electric signal. The audio device 160 may receive an electric signal from the microphone 162, convert the received electric signal to an audio data signal, and transfer the converted audio data signal to the processor 122. The audio device 160 may include an earphone, an ear set, a headphone, or a head set that may be detachably provided in the electronic device 100.

The external port device 170 may directly connect the electronic device 100 to another electronic device or may be indirectly connected to another electronic device through a network (e.g., Internet, Intranet, or wireless Local area network (LAN)). The external port device 170 may include a Universal Serial Bus (USB) port or a FIREWIRE port.

The input and output controller 180 may provide an interface between the peripheral device interface 123 and an input and output device such as the display device 190 and the input device 200. The input and output controller 180 may include a display device controller and other input device controllers.

The display device 190 may provide an input and output interface between the electronic device 100 and a user. The display device 190 may transfer user touch information to the processor 122 using touch detection technology and show visual information, text, graphic, or video provided from the processor 122 to the user.

The display device 190 may display state information of the electronic device 100, a moving picture, a still picture, and a character in which the user inputs. Further, the display device 190 may display application related information driven by the processor 122. Such a display device 190 may use at least one of a Liquid Crystal Display (LCD), an Organic Light Emitting Diode (OLED), an Active Mode Organic Light Emitting Diode (AMOLED), a Thin Film Transistor-Liquid Crystal Display (TFT-LCD), a flexible display, and a three-dimensional (3D) display.

The input device 200 may provide input data generated by a user selection to the processor 122 through the input and output controller 180. The input device 200 may include a keypad including at least one hardware button and a touch pad that detects touch information.

The input device 200 may include an up/down button for a volume control and may further include at least one of pointer devices such as a push button, a locker button, a locker switch, a thumb-wheel, a dial, a stick, a mouse, a track-ball, or a stylus in which a corresponding function is given.

The memory 110 may include a non-volatile memory or a high speed Random Access Memory (RAM) such as at least one magnetic disk storage device, at least one light storage device, or a flash memory (e.g., NAND, NOR).

The memory 110 stores software, and such software may include an operating system module 111, a communication module 112, a graphic module 113, a user interface module 114, a camera program 115, an application module 116, a resolution operation module 117, and an Region Of Interest (ROI) operation module 118. A term of a module may be represented with a set of instructions, an instruction set, or a program.

The operating system module 111 may include a built-in operation system such as WINDOWS, LINUX, Darwin, RTXC, UNIX, OS X, Android or VxWorks and include several software components that control a general system operation. A control of such a general system operation may include memory control and management, storage hardware (device) control and management, and power control and management. Further, the operating system module 111 may perform a function of enabling to smoothly perform communication between several hardware (device) and software components (module).

The communication module 112 may perform communication with another electronic device such as a computer, a server, and an electronic device through the wireless communication device 150 or the external port device 170.

The graphic module 113 may include several software components for providing and displaying graphic to the display device 190. The term graphic may indicate a text, a web page, an icon, a digital image, video, and animation.

The user interface module 114 may include several software components related to a user interface. The user interface module 114 may control the display device 190 to display application related information driven by the processor 122. Further, the user interface module 114 may include contents on a change of a user interface state or a condition in which a user interface state is changed.

The camera program 115 may include various software components for performing a camera function.

The application module 116 may include a software component of at least one application installed in the electronic device 100. Such an application may include a browser, an email, a phonebook, a game, an SMS, a Multimedia Message Service (MMS), a Social Network Service (SNS), an instant message, a wake-up call, an MP3 player, a scheduler, a drawing board, a camera, word processing, keyboard emulation, a music player, an address book, a contact list, a widget, Digital Rights Management (DRM), speech recognition, voice duplication, a location determination function, a location based service, and a user authentication service. The term application may be represented with an application program.

The resolution operation module 117 may include various software components for changing a resolution of an image received through the image sensor. Further, the resolution operation module 117 may include related instructions for controlling the image sensor according to a reference resolution of an image for user authentication.

The ROI operation module 118 may include various software components for determining an ROI in an image received through the image sensor.

The processor unit 120 may further include an additional module (instructions) in addition to the foregoing module.

Various functions of the electronic device 100 may be executed by hardware or software including at least one processing or Application Specific Integrated Circuit (ASIC).

Although not shown, the electronic device 100 may include a power system that supplies power to several constituent elements included therein. The power system may include a power source (AC power source or battery), a power error detection circuit, a power converter, a power inverter, a charge device, or a power state display device (light emitting diode). Further, the electronic device 100 may include a power management and control device that performs a function of generating, managing, and distributing power.

In an exemplary embodiment, constituent elements of the electronic device 100 are illustrated, but the present disclosure is not limited thereto. For example, the electronic device 100 may have constituent elements of the number more than or fewer than those shown in the drawings.

Figure 2B:
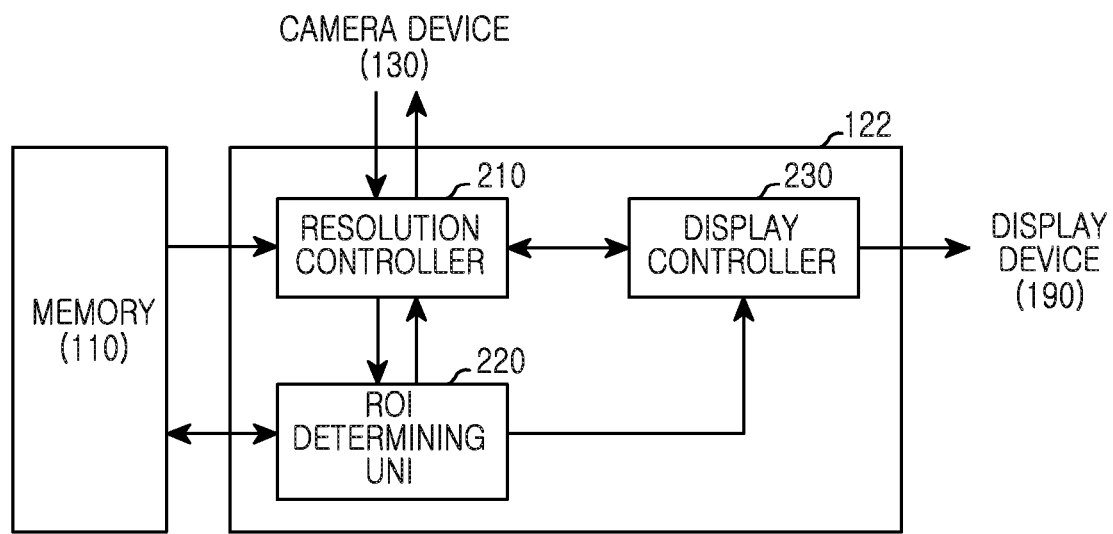
FIG. 2B is a block diagram illustrating a configuration of a processor according to an embodiment of the present disclosure.

FIG. 2B is a block diagram illustrating a configuration of a processor according to an embodiment of the present disclosure.

Referring to FIG. 2B, the processor 122 may include a resolution controller 210, an ROI determining unit 220, and a display controller 230. For example, the resolution controller 210 and the ROI determining unit 220 may be formed in a module.

According to an embodiment, elements of the processor 122 may be formed in separate modules, but in another embodiment, elements of the processor 122 may be included as software components within a module.

By executing the user interface module 114 stored at the memory 110, the display controller 230 may control to display a user interface with graphic in the display device 190.

According to an embodiment, the display controller 230 may control to display an image received from the resolution controller 210 in the display device 190. Further, the display controller 230 may control to display various contents for performing the present disclosure.

By executing the resolution operation module 117 stored at the memory 110, the resolution controller 210 may control the camera device 130.

According to an embodiment, the resolution controller 210 may control to display a received image of a first resolution using the image sensor of the camera device 130.

FIGS. 3A-3F are diagrams illustrating a method of acquiring an ROI according to an embodiment of the present disclosure.

Figure 3A:
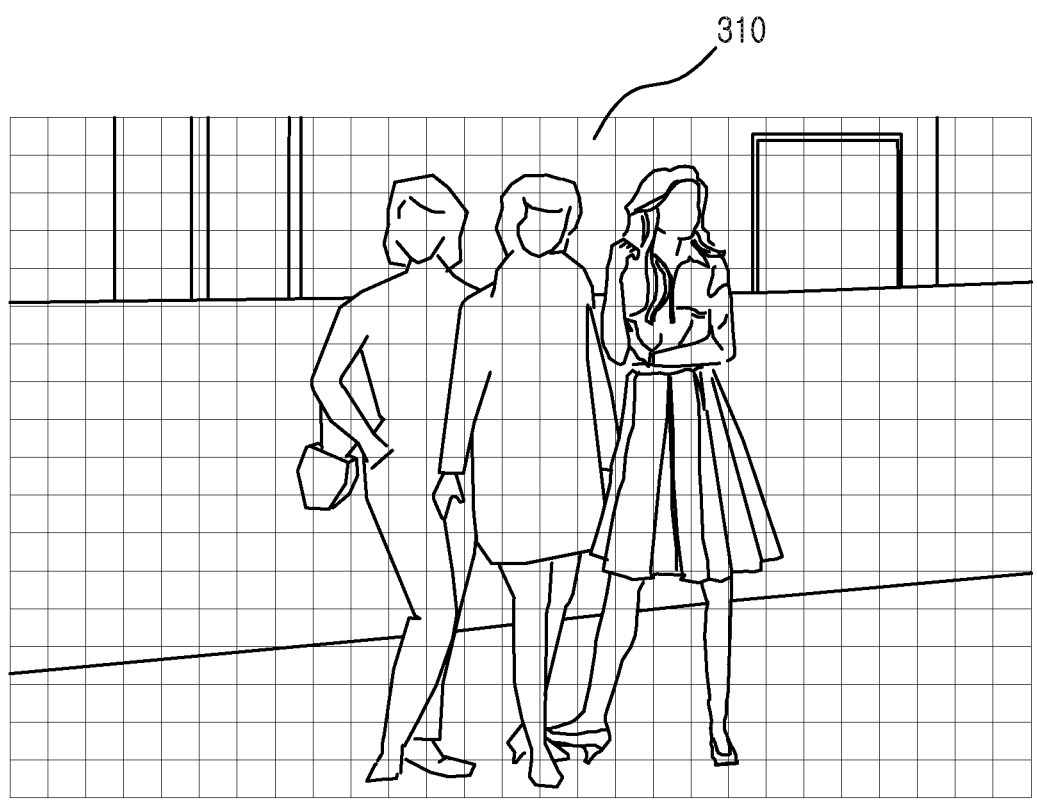
FIGS. 3A, 3B, 3C, 3D, 3E and 3F are diagrams illustrating a method of acquiring an Region Of Interest (ROI) according to an embodiment of the present disclosure.
Figure 3B:
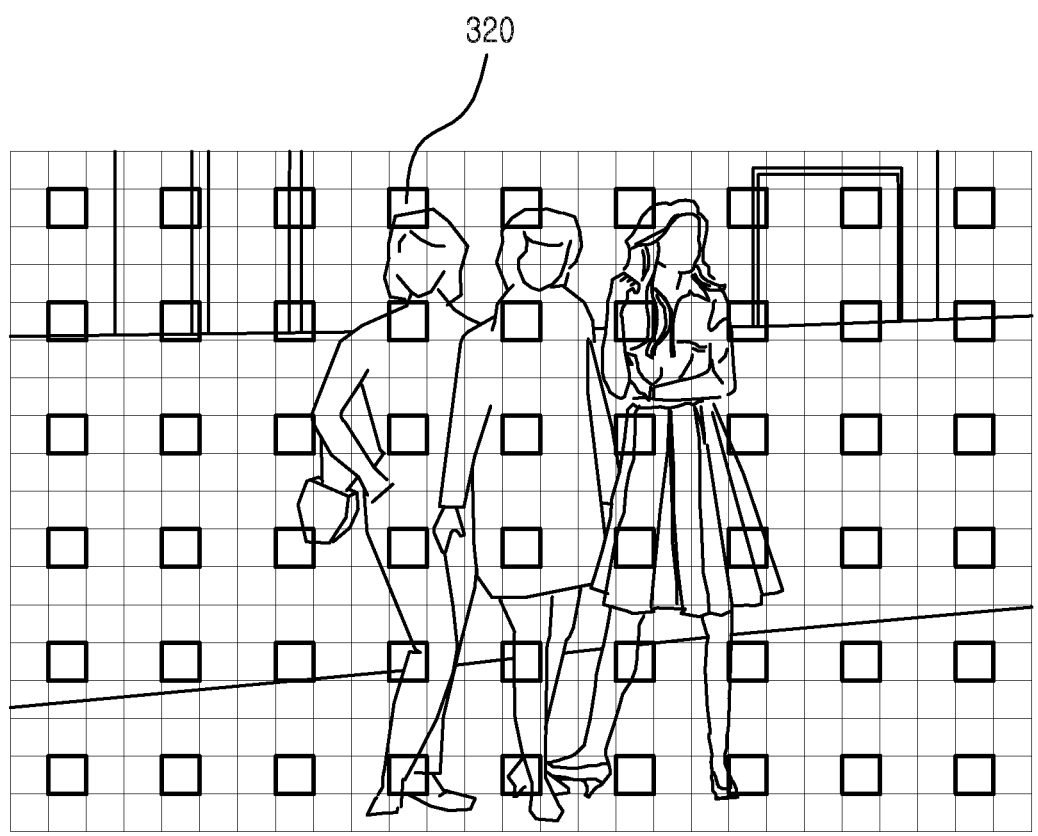
Figure 3C:
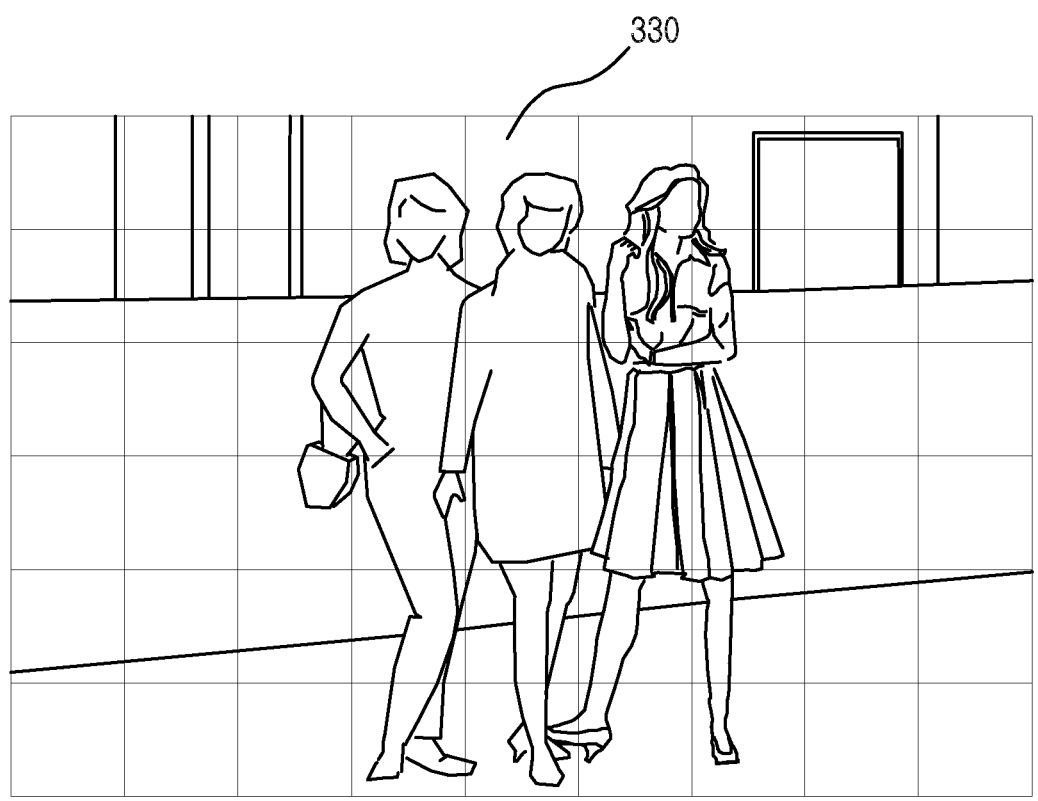

Referring to FIGS. 3A to 3C, the resolution controller 210 may control to output an image 310 having a resolution of 27×18 formed with 27 pixels in a horizontal direction and 18 pixels in a vertical direction into an image 330 having a resolution of 9×6 formed with 9 pixels in a horizontal direction and 6 pixels in a vertical direction within the image sensor.

According to an embodiment, as shown in FIG. 3B, by applying a sub sampling method that changes a resolution with a method of reading one pixel 320 of 9 pixels, the image sensor may perform a down sampling operation. For example, various methods such as a method of reading one pixel 320 of 9 pixels, a method of reading two pixels or more of 9 pixels, a method of reading one pixel of 9 pixels or fewer, or a combination method of the foregoing methods may be applied to the image sensor. The resolution controller 210 may output an image into an image of a first resolution of a low resolution through a down sampling operation within the image sensor.

In an embodiment, a method of performing a down sampling operation using a sub sampling method is described, but the present disclosure is not limited thereto. For example, the image sensor may perform a down sampling operation using at least one of a sub sampling method, a binning method, and a resizing method.

By executing the ROI operation module 118 stored at the memory 110, the ROI determining unit 220 may select a partial region of the image.

According to an embodiment, the ROI determining unit 220 may analyze an entire region of a first resolution image acquired through a down sampling operation within the image sensor and designate at least a partial region. Here, the partial region may be an ROI.

Figure 3D:
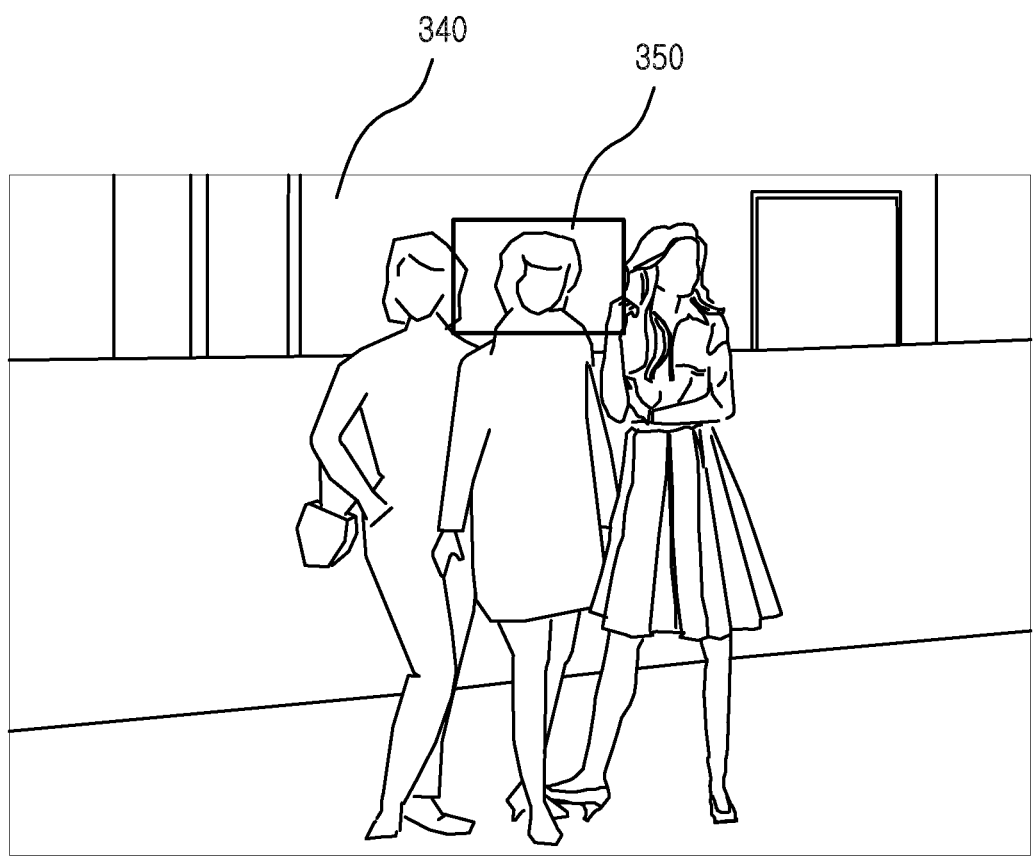

Referring to FIG. 3D, the ROI determining unit 220 may determine at least one ROI 350 in a first resolution image 340. For example, the ROI 350 may be designated in at least one form of a point, a line, a circle, or a polygon.

According to an embodiment, the ROI 350 may be determined based on image attribute information. Such attribute information may include a pattern, a size, or a resolution of an image, but is not limited thereto. For example, in an image pattern, at least one image of an iris image, a face image, or a text or barcode image may be recognized. In such a case, the ROI 350 may include an image area corresponding to at least one of an iris, a face, a text, or a barcode.

According to another embodiment, the ROI 350 may be determined based on at least one user input. For example, a user input may include a touch input of an image or an input corresponding to a voice input, but is not limited thereto.

In the present embodiment, a case in which the ROI 350 is one is described, but the number of the ROI 350 is not limited thereto. For example, at least two ROIs 350 may exist, and each ROI may be determined through different methods.

Figure 3E:
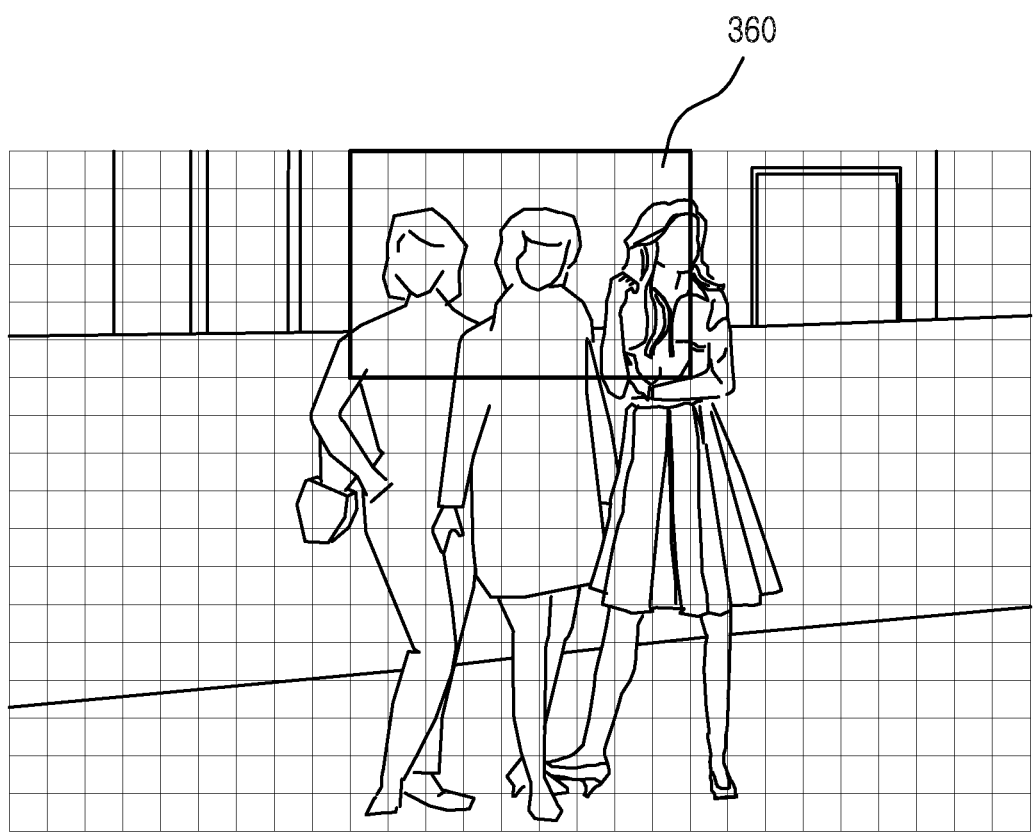
Figure 3F:
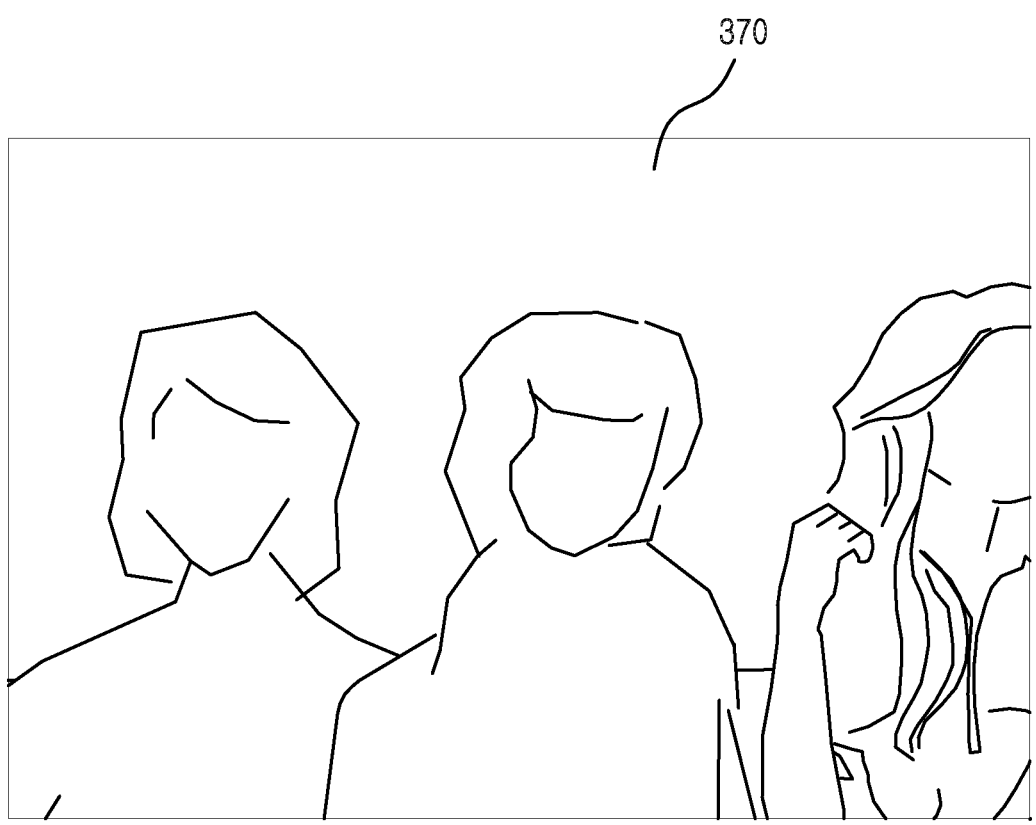

Referring to FIGS. 3E and 3F, the resolution controller 210 may control to determine a display area 360 including the designated ROI 350 and to display the determined display area 360 with a second resolution 370. For example, the pixel number of the display area 360 may correspond with the pixel number of the first resolution image 340. That is, the pixel number of the display area 360 may be 9×6, which is the pixel number of the first resolution image 340. Therefore, when the determined display area 360 is output with the second resolution 370, the entire pixel number is the same, but the corresponding ROI 350 may be more clearly shown.

In the present embodiment, a face image is designated as an ROI, but in the following embodiment, an iris image for authentication is designated as an ROI.

FIGS. 4A, 4B, 4C, 4D, 4E, and 4F are diagrams illustrating a method of acquiring an ROI according to another embodiment of the present disclosure.

Figure 4A:
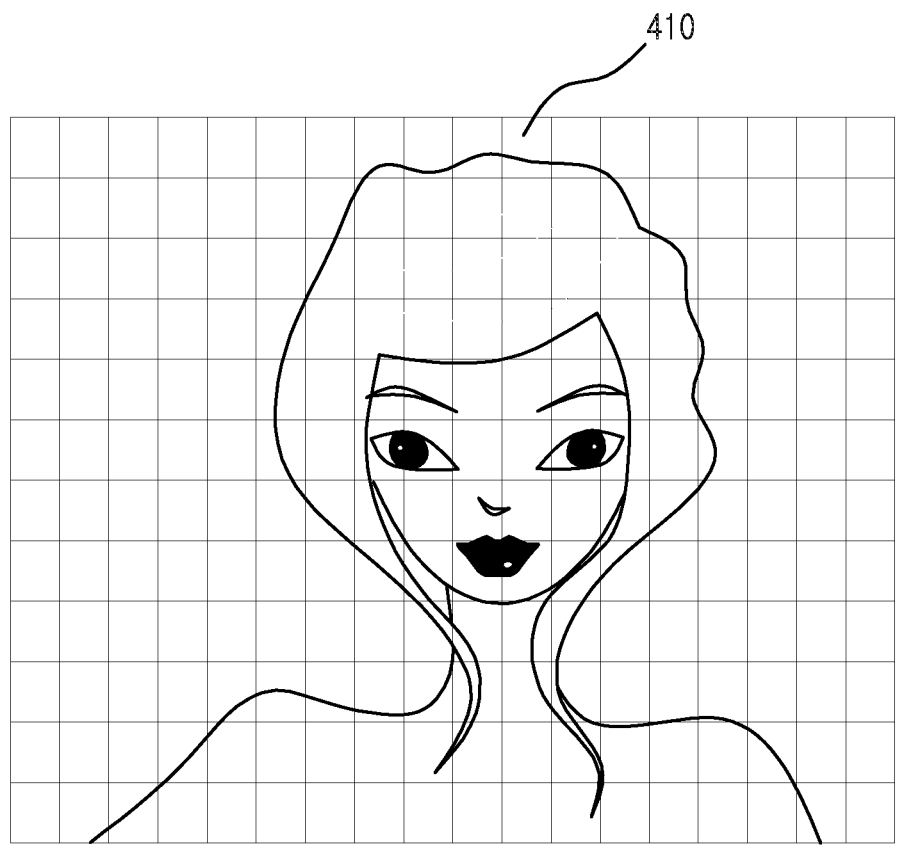
FIGS. 4A, 4B, 4C, 4D, 4E, and 4F are diagrams illustrating a method of acquiring an ROI according to another embodiment of the present disclosure.
Figure 4B:
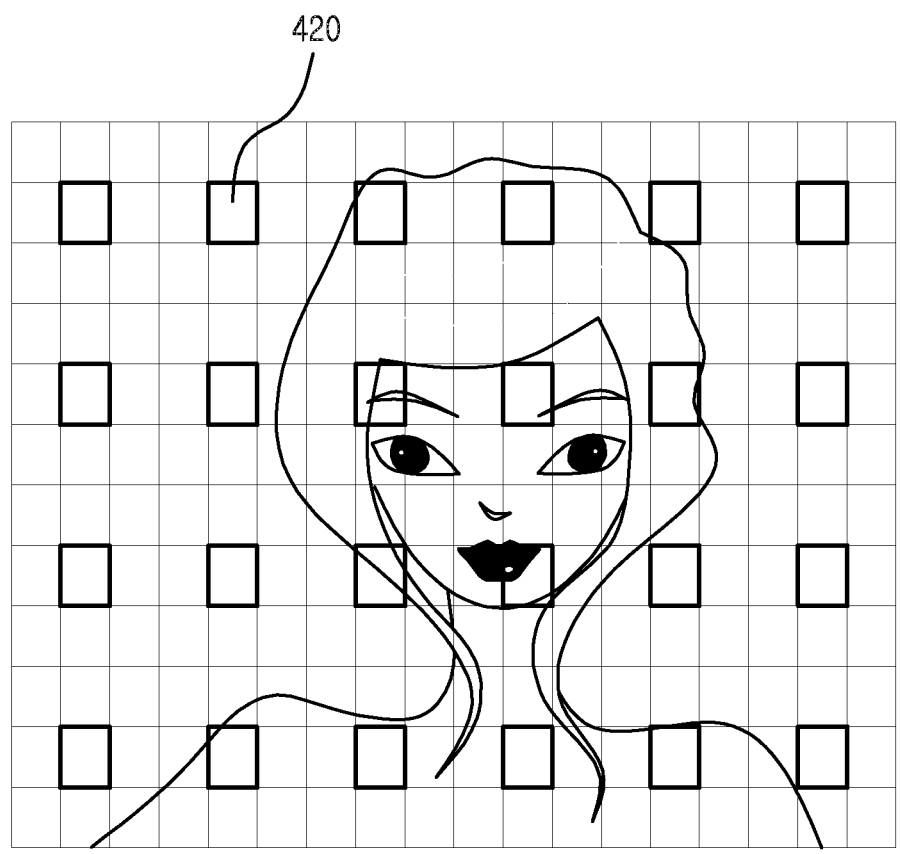
Figure 4C:
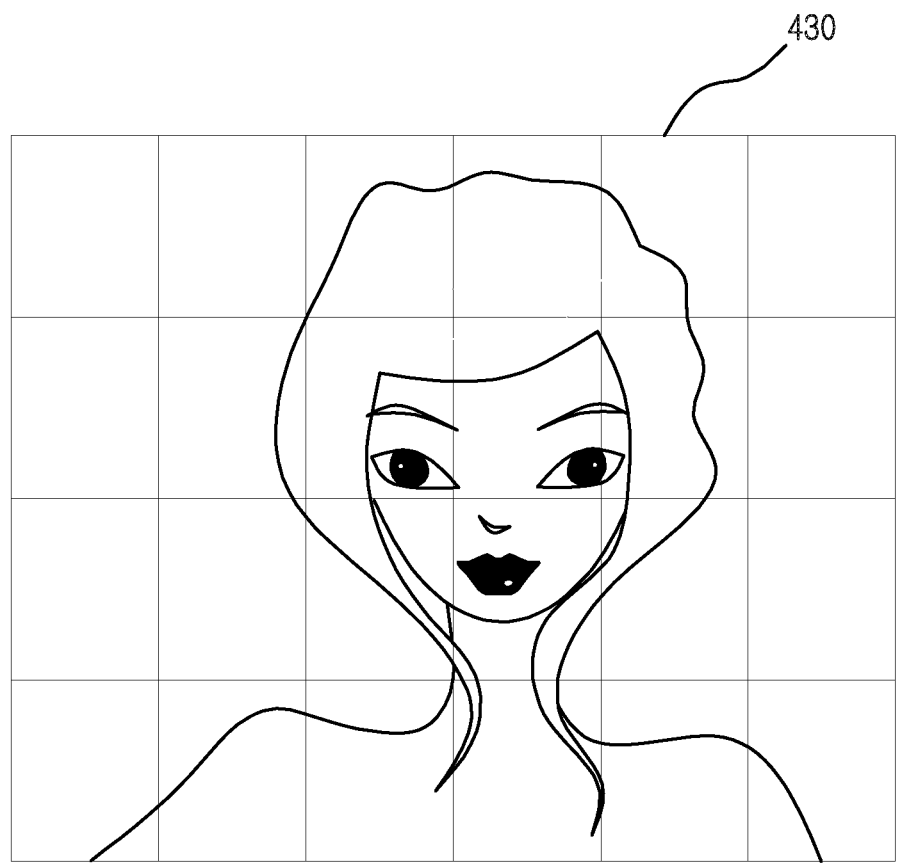

Referring to FIGS. 4A to 4C, the resolution controller 210 may control to output an image 410 having a resolution of 18×12 formed with 18 pixels in a horizontal direction and 12 pixels in a vertical direction into an image having a resolution 430 of 6×4 formed with 6 pixels in a horizontal direction and 4 pixels in a vertical direction within the image sensor.

According to an embodiment, as shown in FIG. 4B, by applying a sub sampling method that changes a resolution with a method of reading one pixel 420 of 9 pixels, the image sensor may perform a down sampling operation. For example, various methods such as a method of reading one pixel 420 of 9 pixels, a method of reading two pixels or more of 9 pixels, a method of reading one pixel of 9 pixels or fewer, or a combination method of the foregoing methods may be applied to the image sensor. The resolution controller 210 may output an image into an image of a first resolution of a low resolution through a down sampling operation within the image sensor.

In the present embodiment, a method of performing a down sampling operation using a sub sampling method is described, but the present disclosure is not limited thereto. For example, the image sensor may perform a down sampling operation using at least one of a sub sampling method, a binning method, and a resizing method.

According to an embodiment, the ROI determining unit 220 may analyze an entire region of a first resolution image acquired through a down sampling operation within the image sensor and designate at least a partial region. Here, the partial region may be an ROI.

Figure 4D:
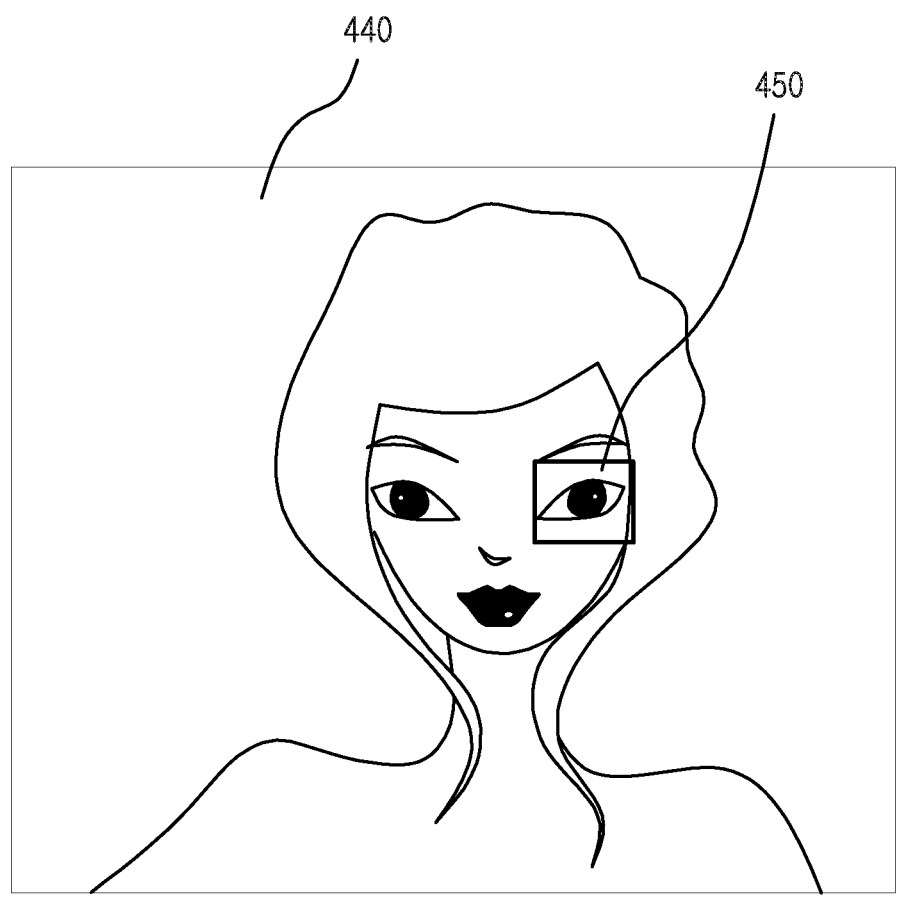

Referring to FIG. 4D, the ROI determining unit 220 may determine at least one ROI 450 in a first resolution image 440. For example, the ROI 450 may be designated in at least one form of a point, a line, a circle, or a polygon.

According to an embodiment, the ROI 450 may be determined based on attribute information of an image. Such attribute information may include a pattern, a size, or a resolution of an image, but is not limited thereto. For example, in an image pattern, at least one image of an iris image, a face image, or a text or barcode image may be recognized. In such a case, the ROI 450 may include an image area corresponding to at least one of an iris, a face, a text, or a barcode.

According to another embodiment, the ROI 450 may be determined based on at least one user input. For example, a user input may include a touch input of an image or an input corresponding to a voice input, but is not limited thereto.

In the present embodiment, a case in which the ROI 450 is one is described, but the number of the ROI 450 is not limited thereto. For example, at least two ROIs 450 may exist, and each ROI may be determined through different methods.

Figure 4E:
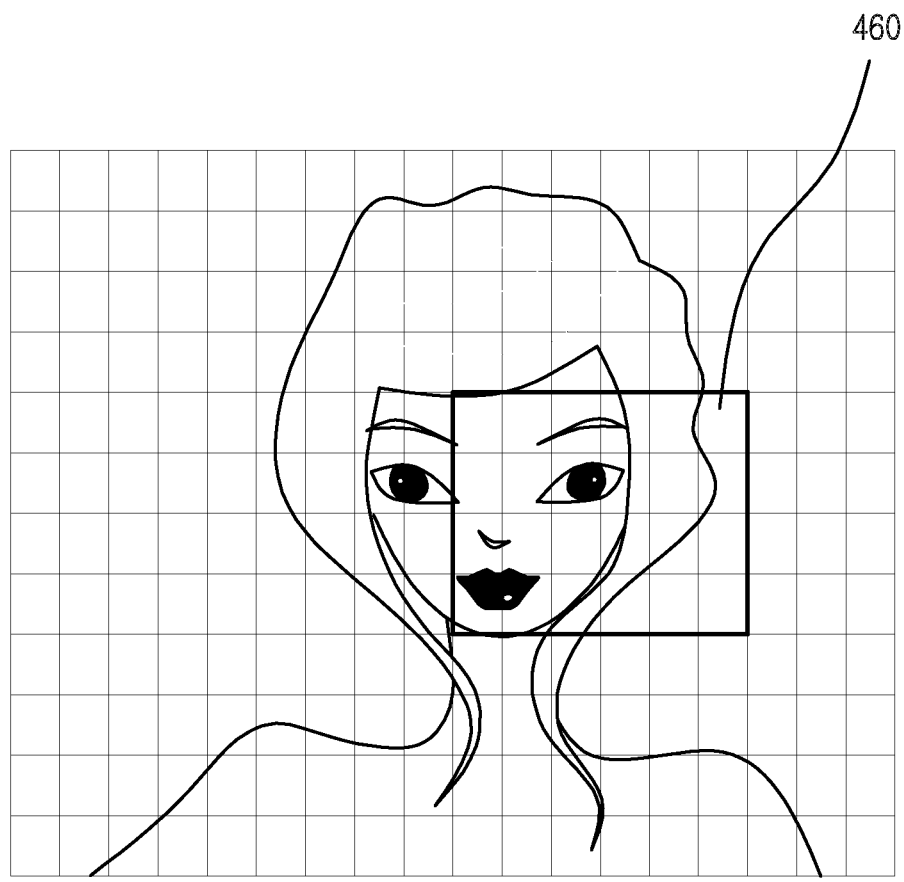
Figure 4F:
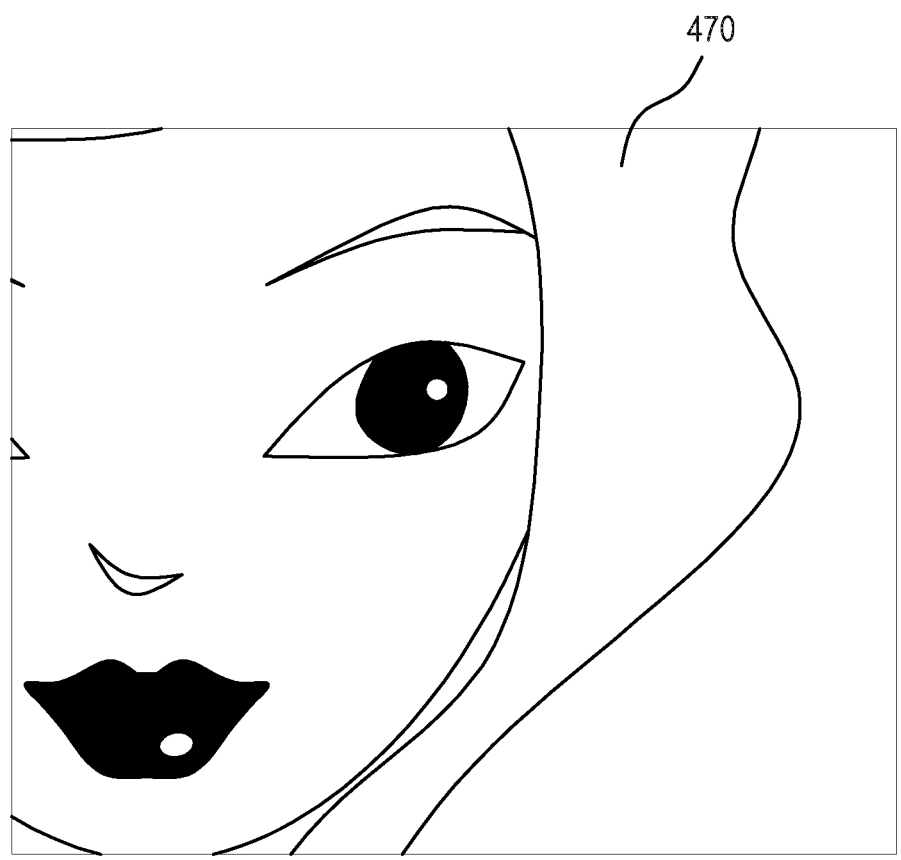

Referring to FIGS. 4E and 4F, the resolution controller 210 may control to determine a display area 460 including the designated ROI 450 and to display the determined display area 460 with a second resolution 470. For example, the pixel number of the display area 460 may correspond with the pixel number of the first resolution image 440. That is, the pixel number of the display area 460 may be 6×4, which is the pixel number of the first resolution image 440. Therefore, when the determined display area 460 is output with the second resolution 470, the entire pixel number is the same, but the corresponding ROI 450 may be more clearly shown.

According to the foregoing embodiments, in an iris recognition process for user authentication, the electronic device 100 can reduce necessary power consumption and increase a processing speed for authentication.

Figure 5:
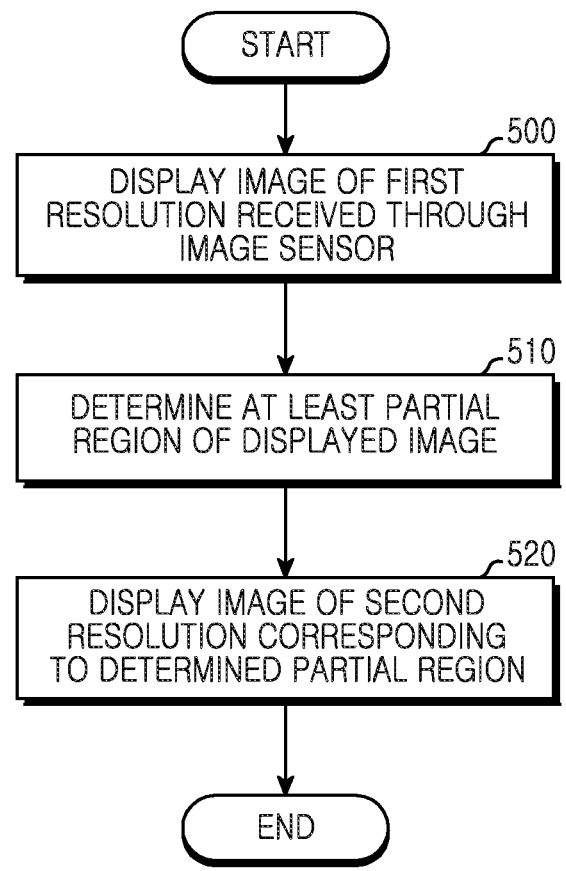
FIG. 5 is a flowchart illustrating a method of operating an electronic device according to an embodiment of the present disclosure.

FIG. 5 is a flowchart illustrating a method of operating an electronic device according to an embodiment of the present disclosure.

Referring to FIG. 5, in operation 500, the electronic device 100 may display an image of a first resolution received through an image sensor.

Referring to FIGS. 3A to 3C, the resolution controller 210 of the electronic device 100 may control to output an image 310 having a resolution of 27×18 formed with 27 pixels in a horizontal direction and 18 pixels in a vertical direction into an image 330 having a resolution of 9×6 formed with 9 pixels in a horizontal direction and 6 pixels in a vertical direction within the image sensor.

According to an embodiment, as shown in FIG. 3B, by applying a sub sampling method that changes a resolution with a method of reading one pixel 320 of 9 pixels, the image sensor may perform a down sampling operation. For example, various methods such as a method of reading one pixel 320 of 9 pixels, a method of reading two pixels or more of 9 pixels, a method of reading one pixel of 9 pixels or fewer, or a combination method of the foregoing methods may be applied to the image sensor. The resolution controller 210 may output an image into an image of a first resolution of a low resolution through a down sampling operation within the image sensor.

In the present embodiment, a method of performing a down sampling operation using a sub sampling method is described, but the present disclosure is not limited thereto. For example, the image sensor may perform a down sampling operation using at least one of a sub sampling method, a binning method, and a resizing method.

In operation 510, the electronic device 100 may determine at least a partial region of the displayed image.

According to an embodiment, the ROI determining unit 220 of the electronic device 100 may analyze an entire region of a first resolution image acquired through a down sampling operation within the image sensor and designate at least a partial region. Here, the partial region may be an ROI.

Referring to FIG. 3D, the ROI determining unit 220 may determine at least one ROI 350 in the first resolution image 340. For example, the ROI 350 may be designated in at least one form of a point, a line, a circle, or a polygon.

According to an embodiment, the ROI 350 may be determined based on attribute information of an image. Such attribute information may include a pattern, a size, or a resolution of an image, but is not limited thereto. For example, in an image pattern, at least one image of an iris image, a face image, or a text or barcode image may be recognized. In such a case, the ROI 350 may include an image area corresponding to at least one of an iris, a face, a text, or a barcode.

According to another embodiment, the ROI 350 may be determined based on at least one user input. For example, a user input may include a touch input of an image or an input corresponding to a voice input, but is not limited thereto.

In the present embodiment, a case in which the ROI 350 is one is described, but the number of the ROI 350 is not limited thereto. For example, at least two ROIs 350 may exist, and each ROI may be determined through different methods.

In operation 520, the electronic device 100 may display an image of a second resolution corresponding to the determined partial region.

Referring to FIGS. 3E and 3F, the resolution controller 210 may control to determine a display area 360 including the designated ROI 350 and to display the display area 360 with a second resolution 370. For example, the pixel number of the display area 360 may correspond with the pixel number of the first resolution image 340. That is, the pixel number of the display area 360 may be 9×6, which is the pixel number of the first resolution image 340. Therefore, when the determined display area 360 is output with the second resolution 370, the entire pixel number is the same, but the corresponding ROI 350 may be more clearly shown.

In the present embodiment, a face image is designated as an ROI, but the ROI is not limited thereto. For example, in an iris recognition process for user authentication using the foregoing method, necessary power consumption can be reduced, and a processing speed for authentication can be increased.

An instruction set of such each operation may be stored in at least one module at the memory 110. In this case, the module stored at the memory 110 may be executed by at least one processor 122.

Figure 6:
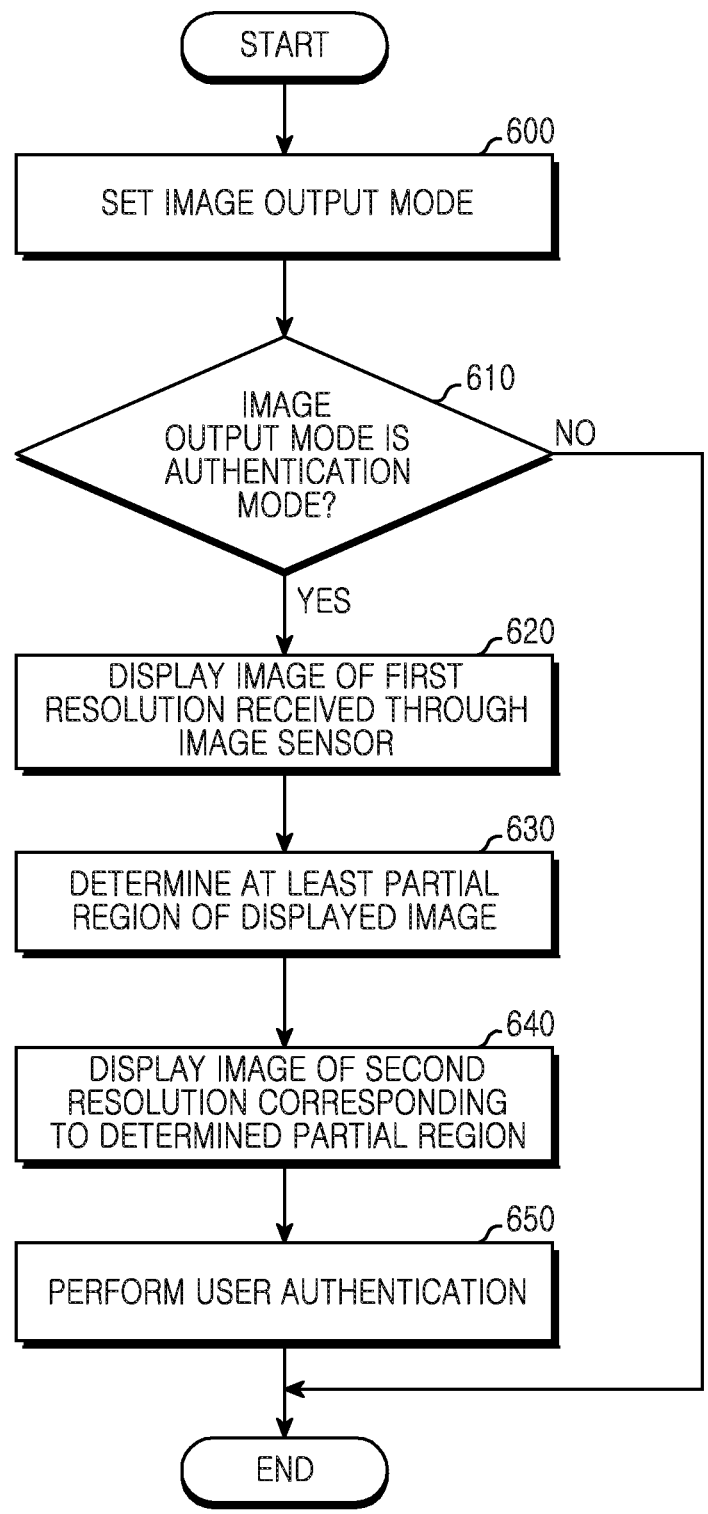
FIG. 6 is a flowchart illustrating a method of operating an electronic device according to another embodiment of the present disclosure.

FIG. 6 is a flowchart illustrating a method of operating an electronic device according to another embodiment of the present disclosure.

Referring to FIG. 6, in operation 600, the electronic device 100 may set an image output mode.

According to an embodiment, the resolution controller 210 of the electronic device 100 may set an image output mode to a general mode or an authentication mode. For example, an authentication mode is to recognize a portion of a human body such as an iris through the image sensor for user authentication. Such an image output mode may be set according to at least one user input.

In operation 610, the electronic device 100 may determine whether the image output mode is an authentication mode.

If the image output mode is an authentication mode, in operation 620, the electronic device 100 may display an image of a first resolution received through the image sensor.

Referring to FIGS. 4A to 4C, the resolution controller 210 of the electronic device 100 may control to output an image having a resolution 410 of 18×12 formed with 18 pixels in a horizontal direction and 12 pixels in a vertical direction into an image having a resolution 430 of 6×4 formed with 6 pixels in a horizontal direction and 4 pixels in a vertical direction within the image sensor.

According to an embodiment, as shown in FIG. 4B, by applying a sub sampling method that changes a resolution with a method of reading one pixel 420 of 9 pixels, the image sensor may perform a down sampling operation. For example, various methods such as a method of reading one pixel 420 of 9 pixels, a method of reading two pixels or more of 9 pixels, a method of reading one pixel of 9 pixels or fewer, or a combination method of the foregoing methods may be applied to the image sensor. The resolution controller 210 may output an image into an image of a first resolution of a low resolution through a down sampling operation within the image sensor.

In the present embodiment, a method of performing a down sampling operation using a sub sampling method is described, but the present disclosure is not limited thereto. For example, the image sensor may perform a down sampling operation using at least one of a sub sampling method, a binning method, and a resizing method.

In operation 630, the electronic device 100 may determine at least a partial region of the displayed image.

According to an embodiment, the ROI determining unit 220 of the electronic device 100 may analyze an entire region of the first resolution image acquired through a down sampling operation within the image sensor and designate at least a partial region. Here, the partial region may be an ROI.

Referring to FIG. 4D, the ROI determining unit 220 may determine at least one ROI 450 within the first resolution image 440. For example, the ROI 450 may be designated in at least one form of a point, a line, a circle, or a polygon.

According to an embodiment, the ROI 450 may be determined based on attribute information of an image. Such attribute information may include a pattern, a size, or a resolution of an image, but is not limited thereto. For example, in an image pattern, at least one image of an iris image, a face image, or a text or barcode image may be recognized. In such a case, the ROI 450 may include an image area corresponding to at least one of an iris, a face, a text, or a barcode.

According to another embodiment, the ROI 450 may be determined based on at least one user input. For example, a user input may include a touch input of an image or an input corresponding to a voice input, but is not limited thereto.

In the present embodiment, a case in which the ROI 450 is one is described, but the number of the ROI 450 is not limited thereto. For example, at least two ROIs 450 may exist, and each ROI may be determined through different methods.

In operation 640, the electronic device 100 may display an image of a second resolution corresponding to the determined partial region.

Referring to FIGS. 4E and 4F, the resolution controller 210 of the electronic device 100 may control to determine a display area 460 including the designated ROI 450 and to display the display area 460 with a second resolution 470. For example, the pixel number of the display area 460 may correspond with the pixel number of the first resolution image 440. That is, the pixel number of the display area 460 may be 6×4, which is the pixel number of the first resolution image 440. Therefore, when the determined display area 460 is output with the second resolution 470, the entire pixel number is the same, but the corresponding ROI 450 may be more clearly shown.

In operation 650, the electronic device 100 may perform user authentication.

According to an embodiment, the electronic device 100 may perform iris recognition for authentication through an image output with the second resolution 470.

According to the foregoing embodiments, in an iris recognition process for user authentication, the electronic device 100 can reduce necessary power consumption and increase a processing speed for authentication.

In the present embodiment, an authentication method through iris recognition is described, but an authentication method is not limited thereto and as an authentication method, a barcode image having a predetermined pattern may be used.

An instruction set of each operation may be stored in at least one module at the memory 110. In this case, the module stored at the memory 110 may be executed by at least one processor 122.

Figure 7:
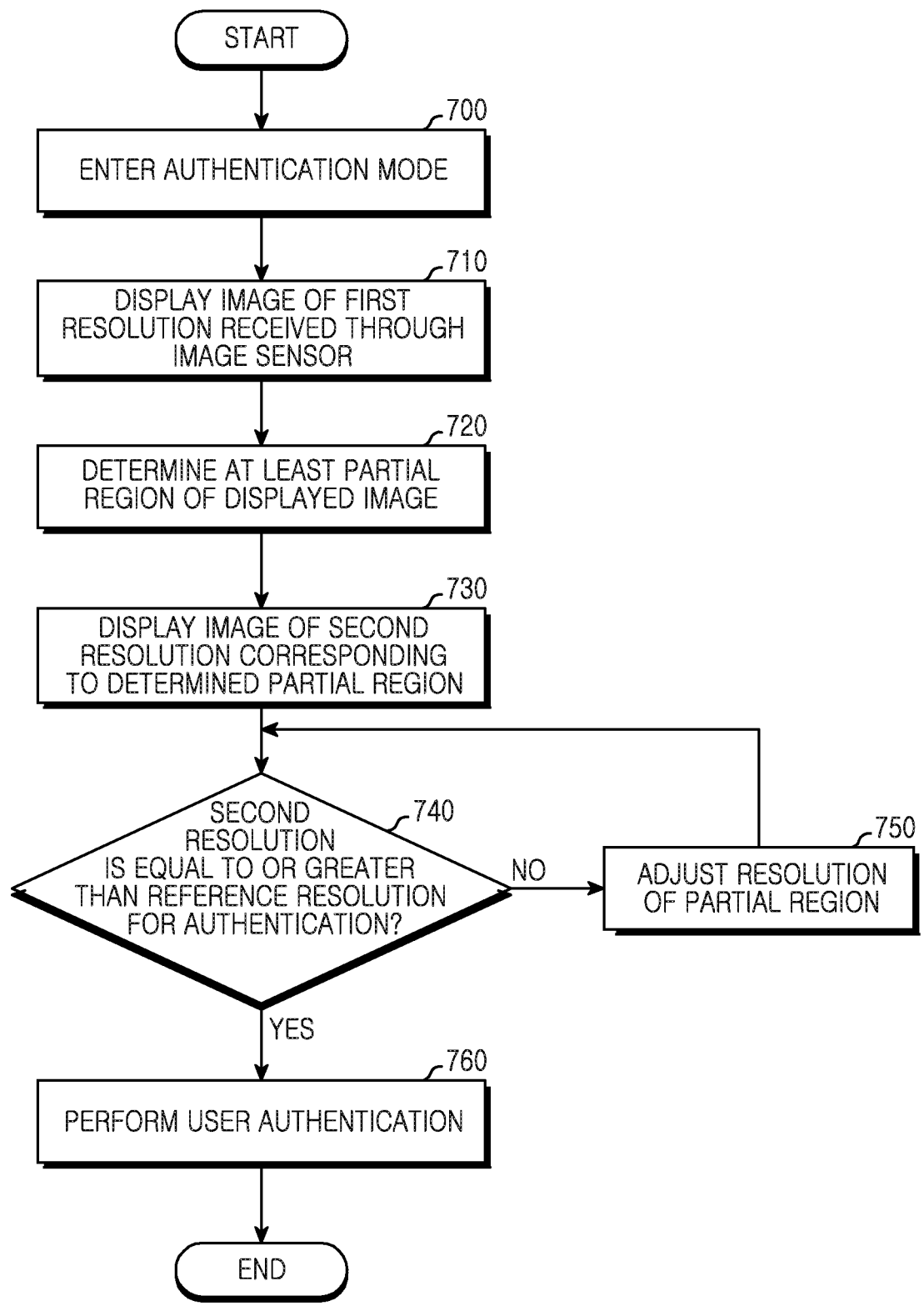
FIG. 7 is a flowchart illustrating a method of operating an electronic device according to another embodiment of the present disclosure.

FIG. 7 is a flowchart illustrating a method of operating an electronic device according to another embodiment of the present disclosure.

Referring to FIG. 7, in operation 700, the electronic device 100 may enter an authentication mode.

According to an embodiment, an authentication mode is to recognize a portion of a human body such as an iris through the image sensor for user authentication. Such an authentication mode may be entered according to at least one user input.

In operation 710, the electronic device 100 may display an image of a first resolution received through the image sensor.

Referring to FIGS. 4A to 4C, the resolution controller 210 of the electronic device 100 may control to output an image having a resolution 410 of 18×12 formed with 18 pixels in a horizontal direction and 12 pixels in a vertical direction into an image having a resolution 430 of 6×4 formed with 6 pixels in a horizontal direction and 4 pixels in a vertical direction within the image sensor.

According to an embodiment, as shown in FIG. 4B, by applying a sub sampling method that changes a resolution with a method of reading one pixel 420 of 9 pixels, the image sensor may perform a down sampling operation. For example, various methods such as a method of reading one pixel 420 of 9 pixels, a method of reading two pixels or more of 9 pixels, a method of reading one pixel of 9 pixels or fewer, or a combination method of the foregoing methods may be applied to the image sensor. The resolution controller 210 may output an image into an image of a first resolution of a low resolution through a down sampling operation within the image sensor.

In the present embodiment, a method of performing a down sampling operation using a sub sampling method is described, but the present disclosure is not limited thereto. For example, the image sensor may perform a down sampling operation using at least one of a sub sampling method, a binning method, and a resizing method.

In operation 720, the electronic device 100 may determine at least a partial region of the displayed image.

According to an embodiment, the ROI determining unit 220 of the electronic device 100 may analyze an entire region of the first resolution image acquired through a down sampling operation within the image sensor and designate at least a partial region. Here, the partial region may be an ROI.

Referring to FIG. 4D, the ROI determining unit 220 may determine at least one ROI 450 in the first resolution image 440. For example, the ROI 450 may be designated in at least one form of a point, a line, a circle, or a polygon.

According to an embodiment, the ROI 450 may be determined based on attribute information of an image. Such attribute information may include a pattern, a size, or a resolution of an image, but is not limited thereto. For example, in an image pattern, at least one image of an iris image, a face image, or a text or barcode image may be recognized. In such a case, the ROI 450 may include an image area corresponding to at least one of an iris, a face, a text, or a barcode.

According to another embodiment, the ROI 450 may be determined based on at least one user input. For example, a user input may include a touch input of an image or an input corresponding to a voice input, but is not limited thereto.

In the present embodiment, a case in which the ROI 450 is one is described, but the number of the ROI 450 is not limited thereto. For example, at least two ROIs 450 may exist, and each ROI may be determined through different methods.

In operation 730, the electronic device 100 may display an image of a second resolution corresponding to the determined partial region.

Referring to FIGS. 4E and 4F, the resolution controller 210 of the electronic device 100 may control to determine a display area 460 including the designated ROI 450 and to display the display area 460 with a second resolution 470. For example, the pixel number of the display area 460 may correspond with the pixel number of the first resolution image 440. That is, the pixel number of the display area 460 may be 6×4, which is the pixel number of the first resolution image 440. Therefore, when the determined display area 460 is output with the second resolution 470, the entire pixel number is the same, but the corresponding ROI 450 may be more clearly shown.

In operation 740, the electronic device 100 may determine whether the second resolution is equal to or greater than a reference resolution for authentication.

If the second resolution is less than a reference resolution for authentication, in operation 750, the electronic device 100 may adjust a resolution of a partial region.

According to an embodiment, if the second resolution is less than a reference resolution for authentication, it is difficult to perform authentication, and thus a resolution of a partial region may be increased to a predetermined resolution. Thereafter, operation 740 may be performed.

If the second resolution is equal to or greater than a reference resolution for authentication, in operation 760, the electronic device 100 may perform user authentication.

According to an embodiment, the electronic device 100 may perform iris recognition for authentication through an image output with the second resolution 470.

According to the foregoing embodiment, the electronic device 100 can reduce necessary power consumption and can increase a processing speed for authentication in an iris recognition process for user authentication.

In the present embodiment, an authentication method through iris recognition is described, but an authentication method is not limited thereto and as an authentication method, a barcode image having a predetermined pattern may be used.

An instruction set of such each operation may be stored in at least one module at the memory 110. In this case, the module stored at the memory 110 may be executed by at least one processor 122.

Figure 8:
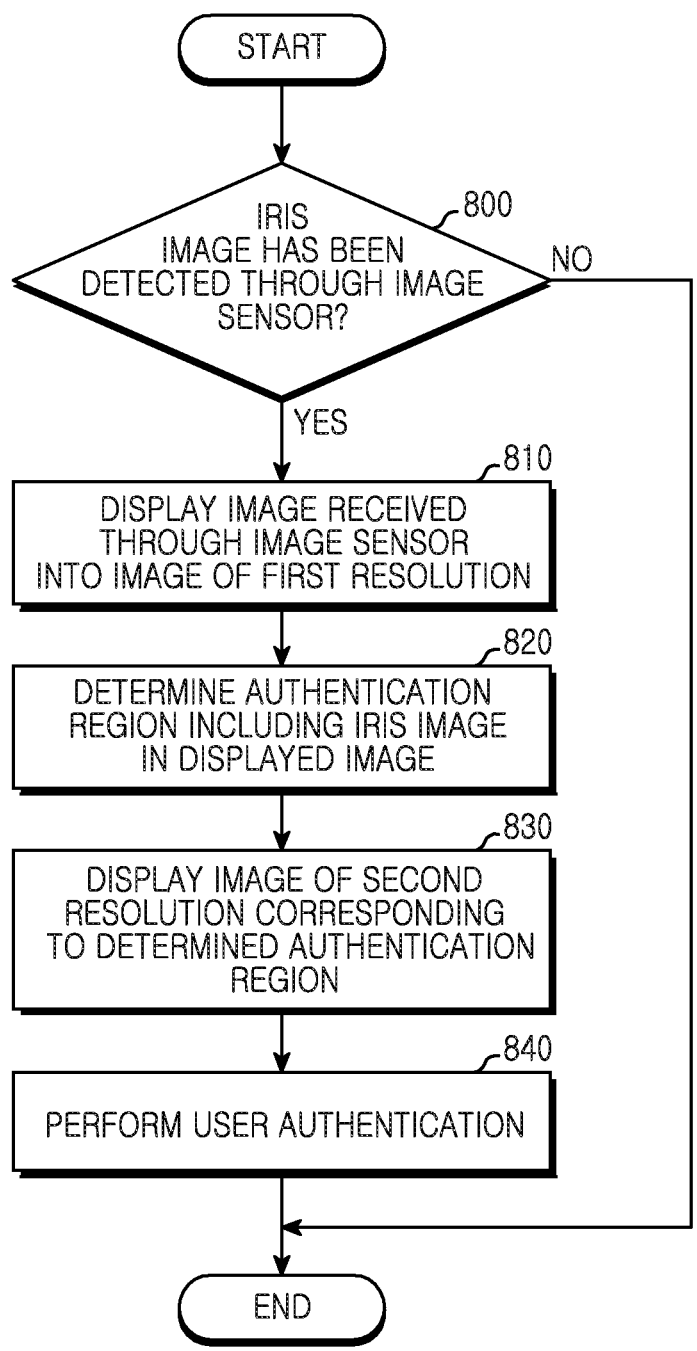
FIG. 8 is a flowchart illustrating a method of operating an electronic device according to various embodiments of the present disclosure.

FIG. 8 is a flowchart illustrating a method of operating an electronic device according to various embodiments of the present disclosure.

Referring to FIG. 8, the electronic device 100 may determine whether an iris image has been detected through the image sensor in operation 800.

According to an embodiment, when the electronic device 100 acquires an iris image of a predetermined size or more, a next operation may be performed.

If an iris image has been detected through the image sensor, the electronic device 100 may display the image received through the image sensor into an image of a first resolution in operation 810.

According to an embodiment, the electronic device 100 may perform a down sampling operation using at least one of a sub sampling method, a binning method, and a resizing method within the image sensor. The electronic device 100 may display an image of the first resolution of a low resolution through such operation.

In operation 820, the electronic device 100 may determine an authentication region including an iris image in the displayed image.

According to an embodiment, the ROI determining unit 220 of the electronic device 100 may analyze an entire region of the first resolution image acquired through a down sampling operation within the image sensor and designate an authentication region including the iris image. Here, the authentication region may be an ROI.

In operation 830, the electronic device 100 may display an image of a second resolution corresponding to the determined authentication region.

According to an embodiment, the electronic device 100 may correspond the pixel number of the determined authentication region with the pixel number of the first resolution image. Therefore, when the authentication region is displayed with the second resolution, the entire pixel number is the same, but an authentication region may be more clearly shown.

In operation 840, the electronic device 100 may perform user authentication.

According to an embodiment, the electronic device 100 may perform iris recognition for authentication through an authentication region image output with the second resolution.

According to the foregoing embodiments, in an iris recognition process for user authentication, the electronic device 100 can reduce necessary power consumption and increase a processing speed for authentication.

An instruction set of such each operation may be stored in at least one module at the memory 110. In this case, the module stored at the memory 110 may be executed by at least one processor 122.

Figure 9:
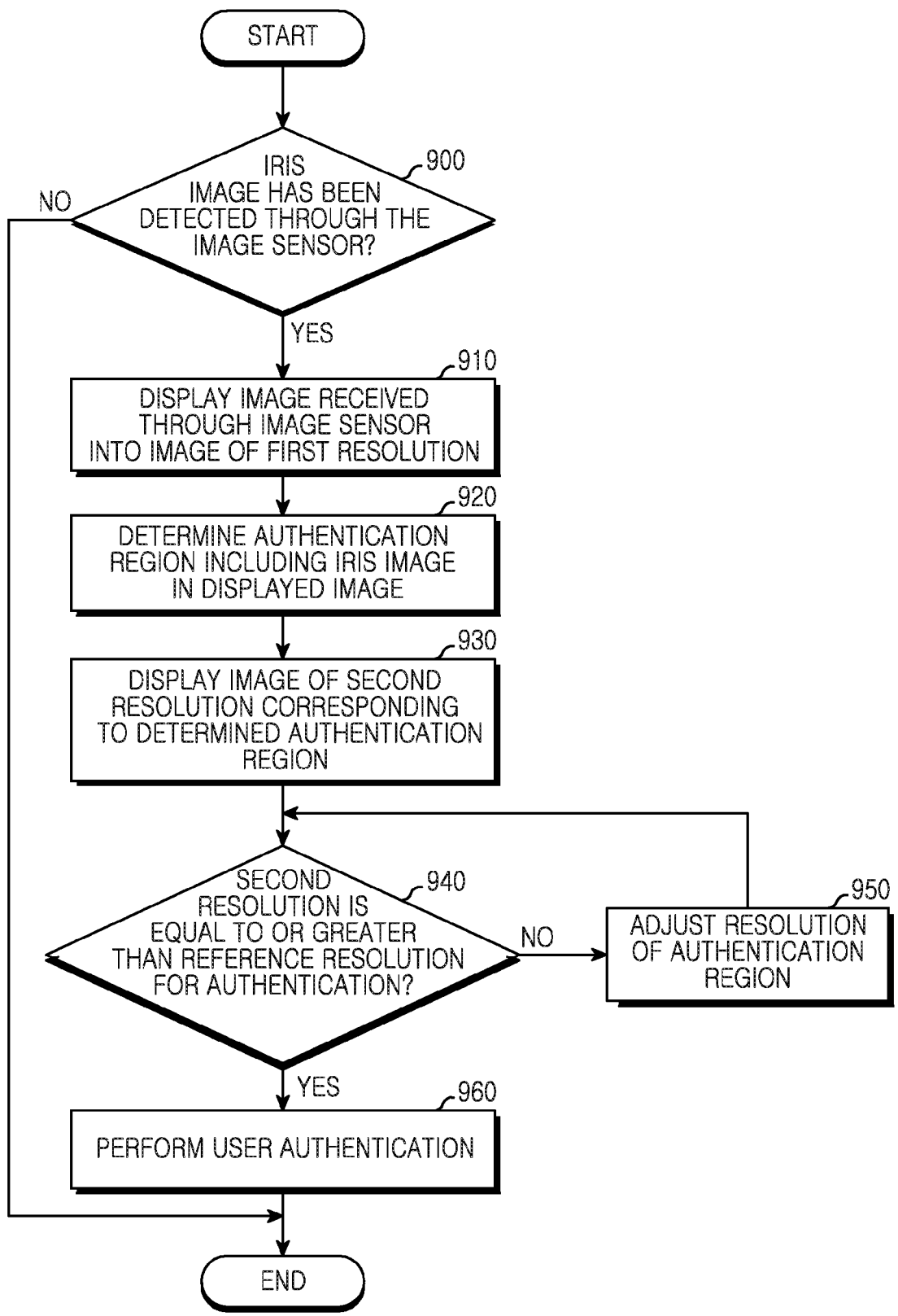
FIG. 9 is a flowchart illustrating a method of operating an electronic device according to various embodiments of the present disclosure.

FIG. 9 is a flowchart illustrating a method of operating an electronic device according to various embodiments of the present disclosure.

Referring to FIG. 9, the electronic device 100 may determine whether an iris image has been detected through the image sensor in operation 900.

According to an embodiment, when an iris image of a predetermined size or more is acquired, the electronic device 100 may perform a next operation.

If an iris image has been detected through the image sensor, the electronic device 100 may display the image received through the image sensor into an image of the first resolution in operation 910.

According to an embodiment, the electronic device 100 may perform a down sampling operation using at least one of a sub sampling method, a binning method, and a resizing method within the image sensor. The electronic device 100 may display an image of the first resolution of a low resolution through such operation.

In operation 920, the electronic device 100 may determine an authentication region including the iris image in the displayed image.

According to an embodiment, the ROI determining unit 220 of the electronic device 100 may analyze an entire region of the first resolution image acquired through a down sampling operation within the image sensor and designate an authentication region including the iris image. Here, the authentication region may be an ROI.

In operation 930, the electronic device 100 may display an image of a second resolution corresponding to the determined authentication region.

According to an embodiment, the electronic device 100 may correspond the pixel number of the determined authentication region with the pixel number of the first resolution image. Therefore, when the authentication region is displayed with the second resolution, the entire pixel number is the same, but an authentication region may be more clearly shown.

In operation 940, the electronic device 100 may determine whether the second resolution is equal to or greater than a reference resolution for authentication.

If the second resolution is less than a reference resolution for authentication, in operation 950, the electronic device 100 may adjust a resolution of an authentication region.

According to an embodiment, if the second resolution is less than a reference resolution for authentication, it is difficult to perform authentication and thus the electronic device 100 may increase a resolution of an authentication region to a predetermined resolution. Thereafter, operation 940 may be performed.

If the second resolution is equal to or greater than a reference resolution for authentication, in operation 960, the electronic device 100 may perform user authentication.

According to an embodiment, the electronic device 100 may perform iris recognition for authentication through an image output with the second resolution.

According to the foregoing embodiments, in an iris recognition process for user authentication, the electronic device 100 can reduce necessary power consumption and increase a processing speed for authentication.

An instruction set of such each operation may be stored in at least one module at the memory 110. In this case, the module stored at the memory 110 may be executed by at least one processor 122.

According to an embodiment of the present disclosure, each module may be formed with software, firmware, hardware, or a combination thereof. A partial module or an entire module may be formed in an entity and may equally perform a function of each module. According to an embodiment of the present disclosure, each operation may be executed sequentially, repeatedly, or in parallel. A partial operation may be omitted or other operations may be added and executed. For example, each operation may be executed by a corresponding module described in an embodiment of the present disclosure.

When implemented with software, a non-transient computer readable storage medium that stores at least one program (software module) may be provided. At least one program stored at the computer readable storage medium may be executed by at least one processor 122 within the electronic device 100. At least one program may include an instruction that enables the electronic device 100 to execute methods according to various embodiments of the present disclosure.

Such a program (software module, software) may be stored at a non-volatile memory including a RAM and a flash memory, a Read-Only Memory (ROM), an Electrically Erasable and Programmable ROM (EEPROM), a magnetic disk storage device, a Compact Disk ROM (CD-ROM), a Digital Versatile Disk (DVD), or an optical storage device of other form, and a magnetic cassette. Alternatively, the program may be stored at a memory formed with a combination of a portion or the entire thereof. Further, each constituent memory may be included in plural.

The program may be stored at an attachable storage device that may access to the electronic device 100 through a communication network such as Internet, Intranet, a LAN, a Wireless LAN (WLAN), or a Storage Area Network (SAN) or a communication network formed with a combination thereof. Such a storage device may access to the electronic device 100 through an external port device.

Further, a separate storage device on the communication network may access to the electronic device 100.

According to various embodiments of the present disclosure, an electronic device can reduce power consumption necessary for authentication, increase an authentication speed, and provide a user interface that can intuitively operate.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   receiving an image;
   outputting the image into a first image having a first resolution through a down sampling operation within an image sensor, the first resolution being lower than a resolution supported in the image sensor;
   displaying the first image;
   determining at least a partial region of the first image;
   acquiring a second image having a second resolution corresponding to the partial region, the second resolution being higher than the first resolution; and
   displaying the second image.

2. The method of claim 1, wherein the determining of at least a partial region comprises determining the partial region based on at least one user input.

3. The method of claim 1, wherein the determining of at least a partial region comprises determining the partial region based on attribute information of the first resolution image.

4. The method of claim 3, wherein the attribute information comprises at least one of a pattern, a size, and a resolution of the first resolution image.

5. The method of claim 1, wherein the partial region comprises an image area corresponding to at least one of an iris, a face, a text, and a barcode.

6. The method of claim 1, wherein the first resolution and the second resolution have the same pixel number.

7. The method of claim 1, further comprising determining whether the second resolution is equal to or greater than a reference resolution for authentication.

8. The method of claim 7, further comprising increasing the second resolution by a predetermined value, if the second resolution is less than a reference resolution for authentication.

9. An electronic device comprising:
   a display device;
   at least one image sensor; and
   at least one processor,
   wherein the processor is configured to:
      receive an image,
      output the image into a first image having a first resolution through a down sampling operation within the at least one image sensor, the first resolution being lower than a resolution supported in the image sensor,
      display the first image,
      determine at least a partial region of the first image,
      acquire a second image having a second resolution corresponding to the partial region, the second resolution being higher than the first resolution, and
      display the second image.

10. The electronic device of claim 9, wherein the processor is further configured to determine the partial region based on at least one user input.

11. The electronic device of claim 9, wherein the processor is further configured to determine the partial region based on attribute information of the image.

12. The electronic device of claim 11, wherein the attribute information comprises at least one of a pattern, a size, and a resolution of the first resolution image.

13. The electronic device of claim 9, wherein the partial region comprises an image area corresponding to at least one of an iris, a face, a text, and a barcode.

14. The electronic device of claim 9, wherein the processor is further configured to enable the first resolution and the second resolution to have the same pixel number.

15. The electronic device of claim 9, wherein the processor is further configured to determine whether the second resolution is equal to or greater than a reference resolution for authentication.

16. The electronic device of claim 15, wherein the processor is further configured to increase the second resolution by a predetermined value, if the second resolution is less than a reference resolution for authentication.

17. A non-transitory computer readable storage medium that stores at least one program comprising instructions that enable an electronic device to perform the method of claim 1, when being executed by the electronic device.

\* \* \* \* \*